(12) United States Patent
Brooks et al.

(10) Patent No.: US 6,716,400 B2
(45) Date of Patent: Apr. 6, 2004

(54) IGNITION SYSTEM FOR A FUEL CELL HYDROGEN GENERATOR

(75) Inventors: Christopher J. Brooks, Dublin, OH (US); James Seaba, Dublin, OH (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 52 days.

(21) Appl. No.: 09/847,727

(22) Filed: May 2, 2001

(65) Prior Publication Data

US 2002/0159932 A1 Oct. 31, 2002

Related U.S. Application Data

(63) Continuation-in-part of application No. 09/803,592, filed on Mar. 9, 2001.

(51) Int. Cl.[7] ............... F28D 9/00; B01J 8/00; H01M 8/06
(52) U.S. Cl. ............ 422/198; 422/188; 422/189; 429/19
(58) Field of Search ................ 422/188–190, 422/198, 200, 211, 222; 165/164, 165, 166; 48/61; 432/128, 133; 429/19–20, 17

(56) References Cited

U.S. PATENT DOCUMENTS

| | | | | |
|---|---|---|---|---|
| 5,250,489 A | * | 10/1993 | Dalla Betta et al. | 502/262 |
| 5,700,434 A | * | 12/1997 | Gaiser | 422/173 |
| 6,077,620 A | * | 6/2000 | Pettit | 429/26 |
| 6,096,286 A | * | 8/2000 | Autenrieth | 423/651 |
| 6,299,994 B1 | * | 10/2001 | Towler et al. | 429/17 |
| 2002/0168307 A1 | * | 11/2002 | Seaba et al. | 422/198 |

FOREIGN PATENT DOCUMENTS

| | | | | |
|---|---|---|---|---|
| DE | 19746251 A1 | * | 4/1999 | B01J/8/00 |
| JP | 11176461 A | * | 7/1999 | H01M/8/06 |

* cited by examiner

Primary Examiner—Hien Tran
Assistant Examiner—Jennifer A. Leung
(74) Attorney, Agent, or Firm—Porter Wright Morris & Arthur LLP; Mark E. Duell

(57) ABSTRACT

An ignition system for initiating a fuel cell hydrogen production cycle on demand comprising a module having heat exchanger functions interconnected in an adjacent heater/vaporizer relationship in which a first heat exchanger section in the module is connected to a source of hydrogen enriched gas to provide an initial energy burst to begin the vaporization of liquid hydrocarbons for use in the hydrogen producing cycle; and in which, after system start up, the module section may be inactivated or integrated in the hydrogen producing cycle.

25 Claims, 12 Drawing Sheets

IGNITION SYSTEM FOR A FUEL CELL HYDROGEN GENERATOR

CROSS-REFERENCE TO RELATED APPLICATIONS

This application is a continuation-in-part of our co-pending application "Micro Component Liquid Hydrocarbon Reformer System and Cycle for Producing Hydrogen," Ser. No. 09/803,592, filed on Mar. 9, 2001.

BACKGROUND OF THE INVENTION

The present invention relates to an ignition system for a hydrogen generation process that is used to provide a source of hydrogen for a fuel cell. A micro component start module is provided. In general, the invention initiates a hydrogen generation fuel cell system with an instantaneous burst of energy derived from the combustion of a minor quantity of stored hydrogen. Once initiated, the integrated system produces hydrogen gas for powering a fuel cell for automotive and other scalable power requirements where a discrete or mobile source of hydrogen in a predetermined on demand quantity is desired.

Hydrogen fuel cells are non-polluting, highly efficient power sources. See, e.g., FUEL CELLS GREEN POWER, Los Alamos National Laboratory, U.S. Department of Energy, 1999. [Accessible on the World Wide Web at the address: www.eren.doe.gov/RE/hydrogen_fuel_cells.html.] Despite their desirable characteristics, the use of fuel cells in motor vehicle and transportation applications is hindered because convenient, safe and mobile sources of hydrogen having a size and operation characteristics appropriate for a vehicle (e.g., quick start up and shut down) or other mobile or predetermined output requirements are not available.

It is an object of the invention to provide an on demand ignition system for a cycle that produces hydrogen gas to feed an electric power producing fuel cell. It is a further object to provide an ignition system that is reliable, convenient, safe, and adaptable for fuel cell systems used in automotive, mobile, and other discrete low power requirement uses in which on demand start up is a requirement.

The prior art considers steam reformer hydrogen processor systems to be difficult to use with motor vehicles because, inter alia, the steam reforming process requires an extended time in a start mode before a continuous cycle can be initiated. See, "Fuel Cell Technology Automotive Engineer, September 2000, pages 78 et seq. Delays and difficulties in starting an automobile or other mobile power source negatively impact the acceptability of the technology because on demand use is a pre-condition for such applications. Hydrogen storage requirements have similarly hindered vehicular, mobile and other consumer uses of fuel cells.

It is an object of the invention to provide a start module for initiating a gas production cycle in a hydrogen generation system used with a fuel cell stack. In a preferred embodiment, it is an object to provide a device that enables a reliable and efficient quick start for a steam reforming process for powering hydrogen fuel cells in automotive, mobile and other on demand applications. In a fuel cell system, the invention provides an instantaneous burst of energy sufficient to initiate a hydrogen producing cycle, and reduces the volume and quantity requirements for hydrogen storage in the system.

BRIEF SUMMARY OF THE INVENTION

In the invention, a small quantity of hydrogen gas from an external source is catalytically combusted to provide a heat source to vaporize liquid hydrocarbons and essentially instantaneously initiate the hydrogen producing process in a fuel cell system. Once initiated, a continuously balanced reaction cycle in the system converts a liquid hydrocarbon such as gasoline (a mixture of 50 or more hydrocarbons, modeled by the iso-octane $C_8H_{18}$ component) and water into a hydrogen ($H_2$) enriched gas fuel for powering the fuel cell.

The invention is described more fully in the following description of the preferred embodiment considered in view of the drawings in which:

DETAILED DESCRIPTION OF THE INVENTION AND THE PREFERRED EMBODIMENT

Figure 1:
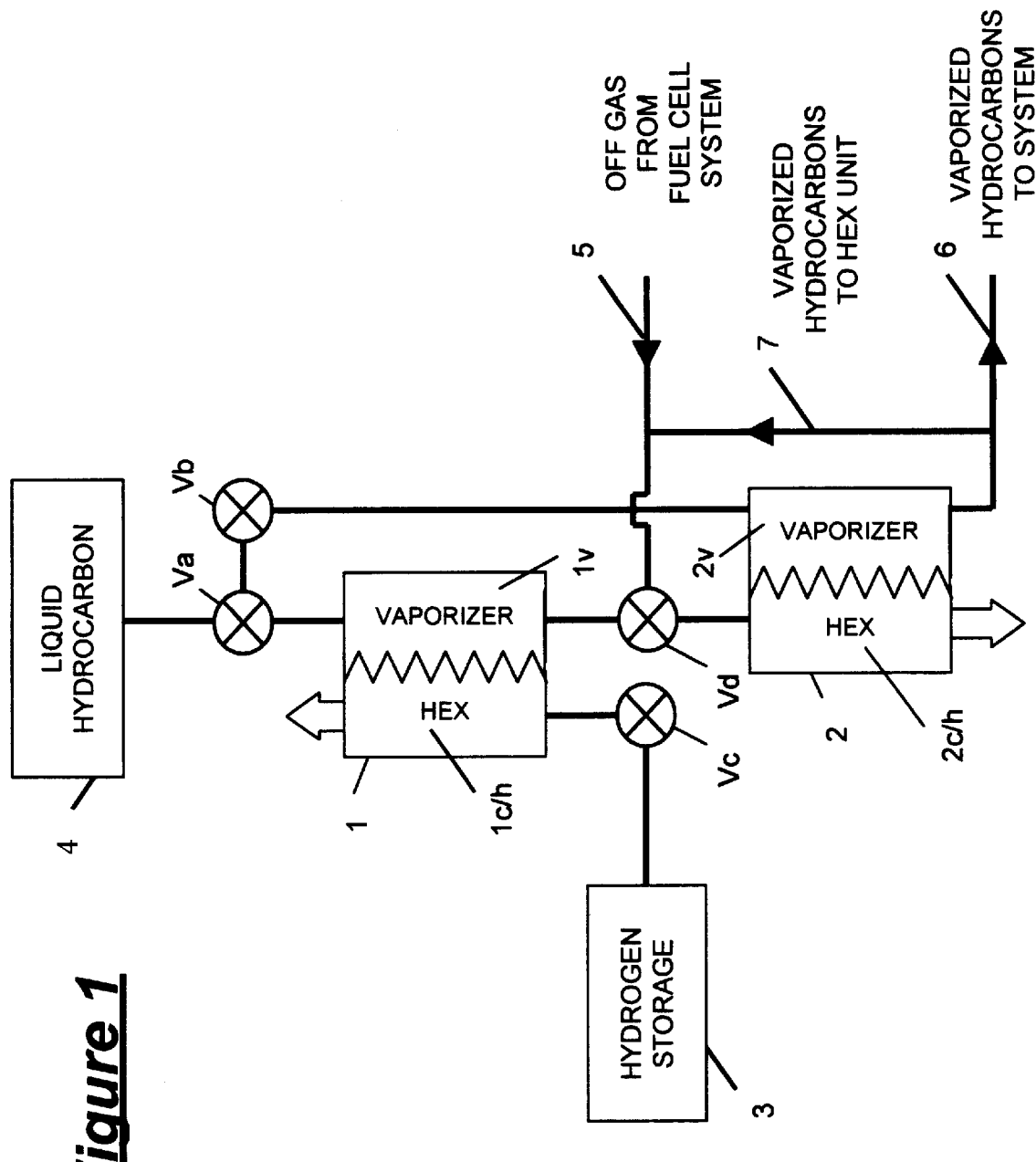
FIG. 1 is a schematic diagram of an embodiment of the ignition system.

The invention is an ignition system or start module for initiating reactions in a steam reformer or auto thermal system that produces hydrogen to power a fuel cell. An instantaneous burst of energy achieved from the combustion of a minor quantity of stored hydrogen initiates the hydrogen production cycle. The system utilizes a pair of modules, or a single module, having vaporizer and heat exchanger functions occurring in one or a plurality of laterally adjacent channels that direct laminar fluid flow. Regulator valves interconnected with flow paths for hydrogen and hydrocarbons in the system control the ignition process. FIG. 1 shows an embodiment of the system including two micro component heat exchangers ("HEX" units) 1 and 2, each having vaporizer 1v and 2v and combustor/heater 1c/h and 2c/h sections interconnected by control valves Va, Vb, Vc and Vd to hydrogen 3 and liquid hydrocarbon 4 storage devices. The ignition system is operatively interconnected to the hydrogen generation/fuel cell cycle to provide at the start, and thereafter, vaporized hydrocarbons 6 for the hydrogen generation/fuel cell cycle. After start up, the ignition HEX unit 2 receives fuel cell off gas 5 from the hydrogen generation/fuel cell cycle to provide combustion heat energy for the hydrocarbon vaporizer.

At start up, valve Vc opens to introduce a flow of hydrogen into the ignition module for a limited period until the associated hydrogen production/fuel cell cycle starts. The hydrogen is catalytically combusted to provide heat introduced to the heater side 1c/h of first HEX unit 1. Valve Va opens and liquid hydrocarbon is directed to the inlet of vaporizer side 1v of unit 1. Vaporized hydrocarbons exit to valve 1v; Valve Vd is switched to direct the vaporized hydrocarbons, which are catalytically combusted, to side 2c/h of HEX unit 2. Combustion may occur before, or within sections 1c/h and 2c/h. The combustion heat generated vaporizes liquid hydrocarbons introduced to vaporizer side 2v upon the opening of valve Vb. The principal proportion of the hydrocarbons vaporized 6 in 2v are directed to the hydrogen generation system for the fuel cell; a minor portion of the vaporized hydrocarbons 7, in the order of approximately 3% to approximately 12% by mass, are circulated to the heater/combustor side 2c/h of unit 2. Once the hydrogen generation system is initiated, valves Va and Vc close and HEX module 1 is inactivated. Fuel cell off gas 5 is introduced into the hydrocarbon flow stream directed to heater/combustor 2c/h side of heat exchanger 2 to provide a source of combustion for heat energy introduced in the HEX unit.

Inlet orifices from a stored source of hydrogen direct a minor quantity of hydrogen to be catalytically combusted to provide initial starting heat energy. Liquid hydrocarbons are simultaneously introduced into the vaporizer in the heat exchanger unit and vaporized for processing in the hydrogen producing system. Stored hydrogen, such as is a component in fuel cell off gas, is used as the starter initiator to heat the vaporizer. A quantity of stored hydrogen may also be mixed with the vaporized hydrocarbons in the feed stock directed to the combustor heaters in the hydrogen reforming system.

The initial combustion of a minor quantity of external hydrogen starts the hydrogen production cycle. Once started, stoichiometric quantities of reactants in the hydrogen production/fuel cell system are maintained in balance in a low pressure operating cycle regardless of power drawn from the fuel cell as the system runs according to the predetermined cycle. The ignition system is adapted for use particularly with the steam reformer fuel cell system described in our co-pending application Ser. No. 09/803,592 filed on Mar. 9, 2001, although the ignition system may be adapted to auto thermal systems. The starter includes an ignition stage combustor energized by hydrogen otherwise stored proximate the steam reforming apparatus. Once operating, the fuel source for the hydrogen producing cycle comprises fuel cell off gas, hydrocarbons, and water, and the start function of the module is not required as an element of the fuel cell system.

Figure 1A:
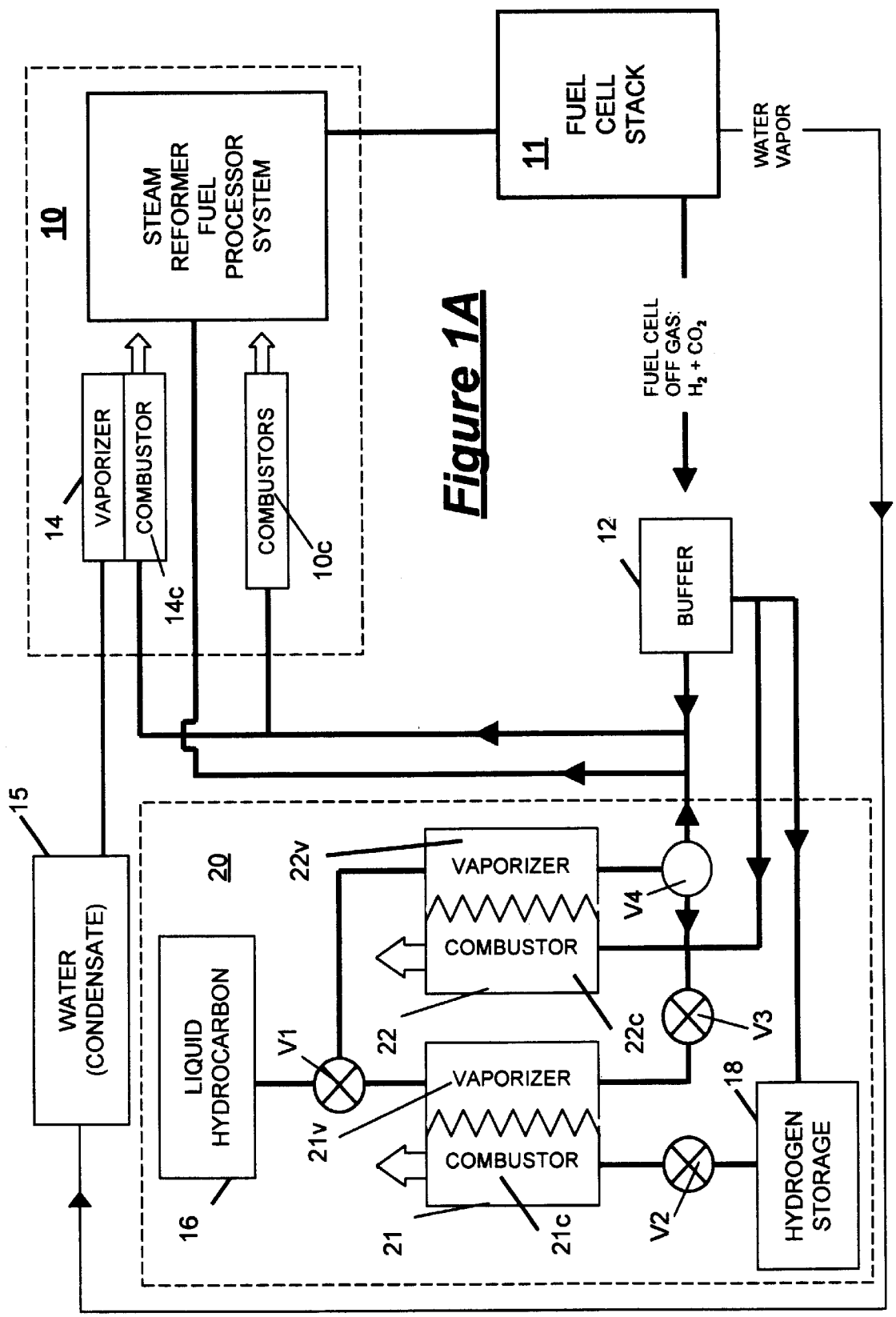
FIG. 1A is a schematic diagram showing the ignition system in relation to a steam reformer process for producing hydrogen to power a fuel cell

An example of a mobile fuel cell system interconnected with the ignition system of the invention is shown in FIG. 1A. Steam reformer based fuel processor system 10 is interconnected with fuel cell stack 11 which in turn connects with off gas buffer 12. The steam reformer system utilizes fuel cell off gas from the cycle to provide combustion and heat energy for use in combustor and heat exchange devices (e.g., unit 10c and section 14c of HEX unit 14) in the system. The hydrogen producing system includes water source 15 (which may comprise stored recycled condensate from fuel cell off gas) and hydrocarbon storage unit 16. The hydrocarbon tank or storage unit 16 is operatively interconnected to starter 20 and to the hydrogen reforming system. Starter 20 in a first embodiment includes a pair of micro component vaporizer/combustor heat exchange units 21 and 22 each having separate and adjacent combustor 20c and 22c and vaporizer 21v and 22v sections. The starter includes control valves V1, V2, V3 and V4 operatively disposed to regulate the flow of hydrogen and hydrocarbons in the system to control the interconnection of the ignition system to the related hydrogen producing cycle.

The powered fuel cell stack 11 produces off-gas comprising $H_2$, $CO_2$, and water vapor ($H_2O$) that are cycled in the system. The specific $H_2$ cycle, although part of a discrete mobile fuel cell unit, is not a critical element of the invention. Starter 20 is provided as an integrated module. In a preferred embodiment, the internal configurations of the heat exchanger sections are described in co-pending applications Ser. No. 09/627,267 filed Jul. 28, 2000 and Ser. No. 09/803,592, filed on Mar. 9, 2001 owned by the assignee of the present application and incorporated by reference herein as if set forth in full.

As shown in FIG. 1A, starter 20 comprises a pair of micro component heat exchanger units 21 and 22 each having combustor sections 21c and 22c adjacent to vaporizer sections 21v and 22v.

The start module 20 is interconnected with a liquid hydrocarbon (e.g., gasoline) source 16 and a source of $H_2$ gas 18 which may be an external source of $H_2$ or stored fuel cell off gas having an $H_2$ component that is otherwise generated and recycled in the system cycle. A buffer tank for off gas in the fuel cell cycle, if needed, is shown as 12. Valves V1, V2, V3 and V4 control the ignition system and its interconnection with the hydrogen reformer/fuel cell system.

Figure 1B:
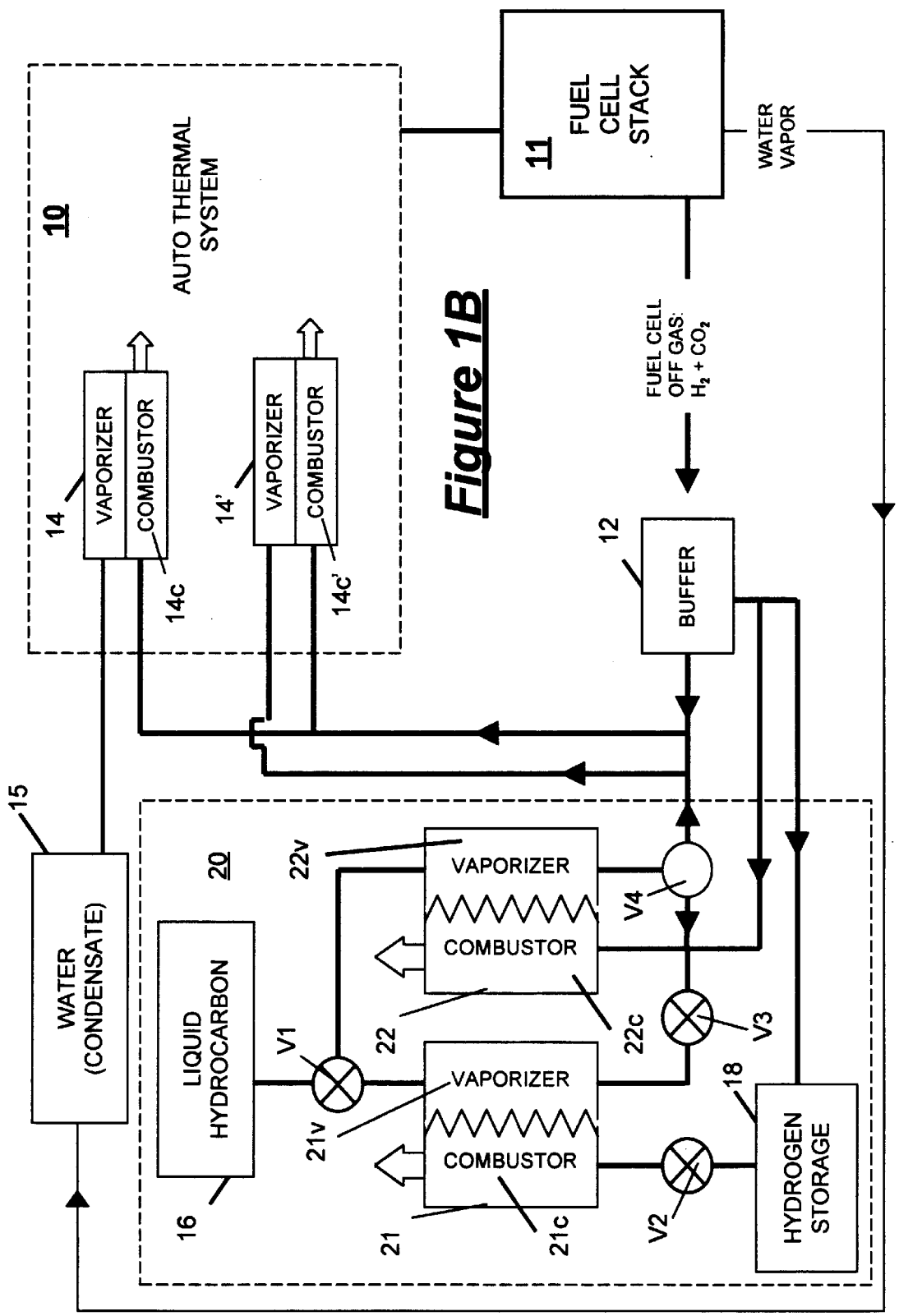
FIG. 1B is a schematic diagram showing the ignition system in relation to an auto thermal system hydrogen for powering a fuel cell.

At ignition, valve V1 is opened simultaneously with, or slightly before valve V2. Opening valve V1 introduces stored $H_2$ from storage unit 18 into the combustor section 21c of heat exchange unit 21, where heat energy is instantaneously generated by the catalytic combustion of hydrogen. Liquid hydrocarbons from tank 16 are introduced into adjacent vaporizer section 21v and are likewise instantaneously vaporized, and through open valve V3, pass to combustor section 22c of heat exchange module 22 where an additional flow of liquid hydrocarbon permitted by open valve V1 is introduced to vaporizer section 22v. In section 22v, the hydrocarbons are vaporized and a portion thereof are in turn introduced to combustor section 22c. Valve V4 allows the feedback of a portion of vaporized hydrocarbons to combustor 22c and the introduction of the vaporized hydrocarbons into the hydrogen generation fuel cell cycle where combustion of the vaporized hydrocarbons generates sufficient heat to initiate the steam reforming reaction. After the cycle starts, valve V1 closes the flow of hydrocarbons to vaporizer 21v and valve V2 closes to terminate the flow of hydrogen to combustor 21c. V3 closes to prevent back flow into vaporizer 21v. V1 continues to allow the flow of liquid hydrocarbons to vaporizer 22v, where, once the steam reforming or auto thermal cycle begins, hydrogen containing fuel cell off gas, introduced through valve V4 and mixed with a proportion of vaporized hydrocarbons provides the energy source for the combustors in the system as the fuel cell cycle operates, FIG. 1B shows an interconnection of the ignition unit with an auto thermal hydrogen producing cycle showing an additional vaporizer 14'/combustor 14c' HEX unit.

Table I provides an example of the micro component heat exchanger section properties of the two HEX units 21 and 22 in the system. Functions of and catalysts on the separator wavyplate that divides the respective module sections are described:

TABLE I

MODULE SECTION PROPERTIES

| | |
|---|---|
| Unit 21: Combustor 21c: | Function: Hydrogen is combusted. Catalyst on wavyplate separator: Pd |
| Unit 21: Vaporizer 21v: | Function: Hydrocarbons are vaporized. Catalyst on wavyplate separator: None. |
| Unit 22: Combustor 22c: | Function: Step 1 (start): Vaporized hydrocarbons from 21v are mixed with air and combusted; Heat energy is directed to vaporizer 22v. Function: Step 2 (after start): Vaporized hydrocarbons from 22v are mixed with fuel cell off gas and combusted; Heat energy is directed to vaporizer 22v. Catalyst on wavyplate separator: Pt/Pd |
| Unit 22: Vaporizer 22v: | Function: Liquid hydrocarbons are vaporized. Catalyst on wavyplate separator: None. |

Figure 2A:
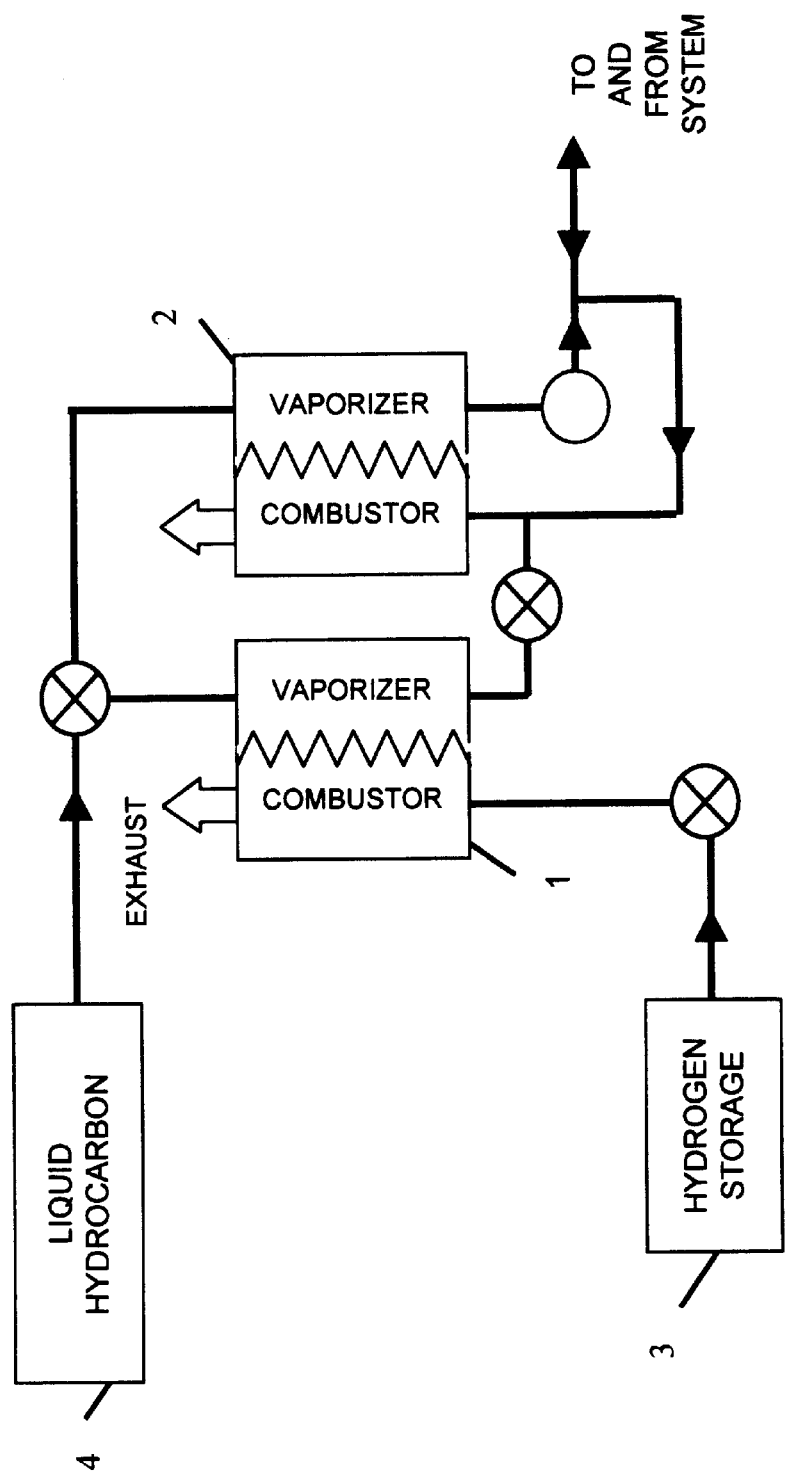
FIG. 2A is a diagram of an ignition system with two micro component combustor/vaporizer heat exchanger units, interconnected with (a) starting sources of hydrogen gas and liquid hydrocarbons, and in turn, with (b) the hydrogen producing/fuel cell cycle.
Figure 2B:
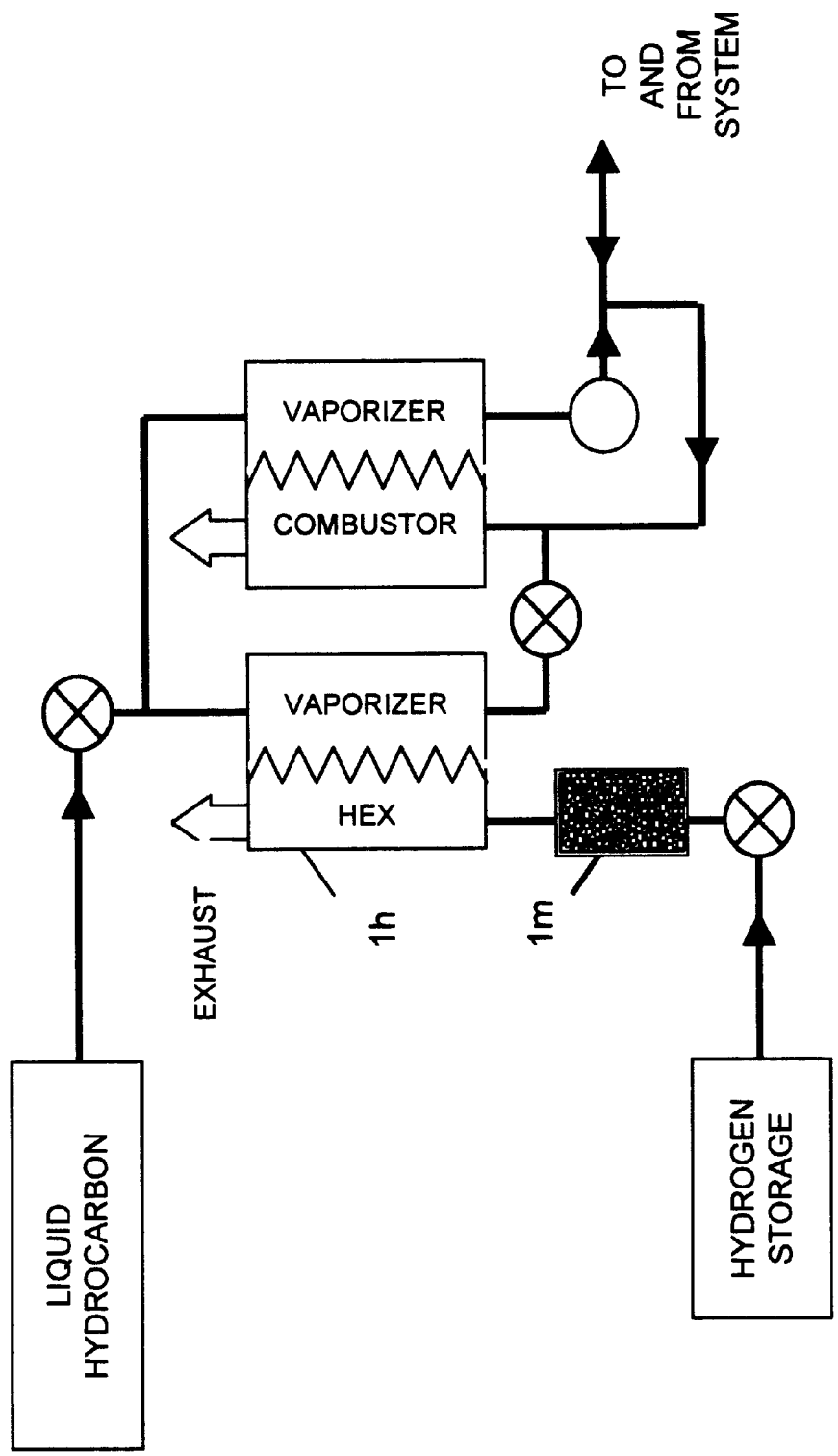
FIG. 2B is an alternate embodiment of the system of FIG. 2A in which a catalytic pre-combustor for hydrogen provides energy to a heat exchanger unit.

FIG. 2A illustrates the ignition system as a unit including the heat exchange micro components and valves and the system interconnections, separate from the hydrogen producing system and fuel cell apparatus with which the ignition system is used. FIG. 2B shows an adaptation of the system in which the heater side of the HEX unit does not include a catalyst. Between the hydrogen source and the flow path to side 1h of the HEX unit is a metal foam catalyst 1m (a metal foam impregnated with a catalyst material) unit that initiates the combustion of hydrogen. Heat from the catalytic combustion of hydrogen in unit 1m is introduced to section 1h of the micro component HEX device that functions, in this example, solely as a heat exchanger to induce vaporization of the liquid hydrocarbons introduced on the opposite side of the wavyplate in the exchanger.

Figure 3A:
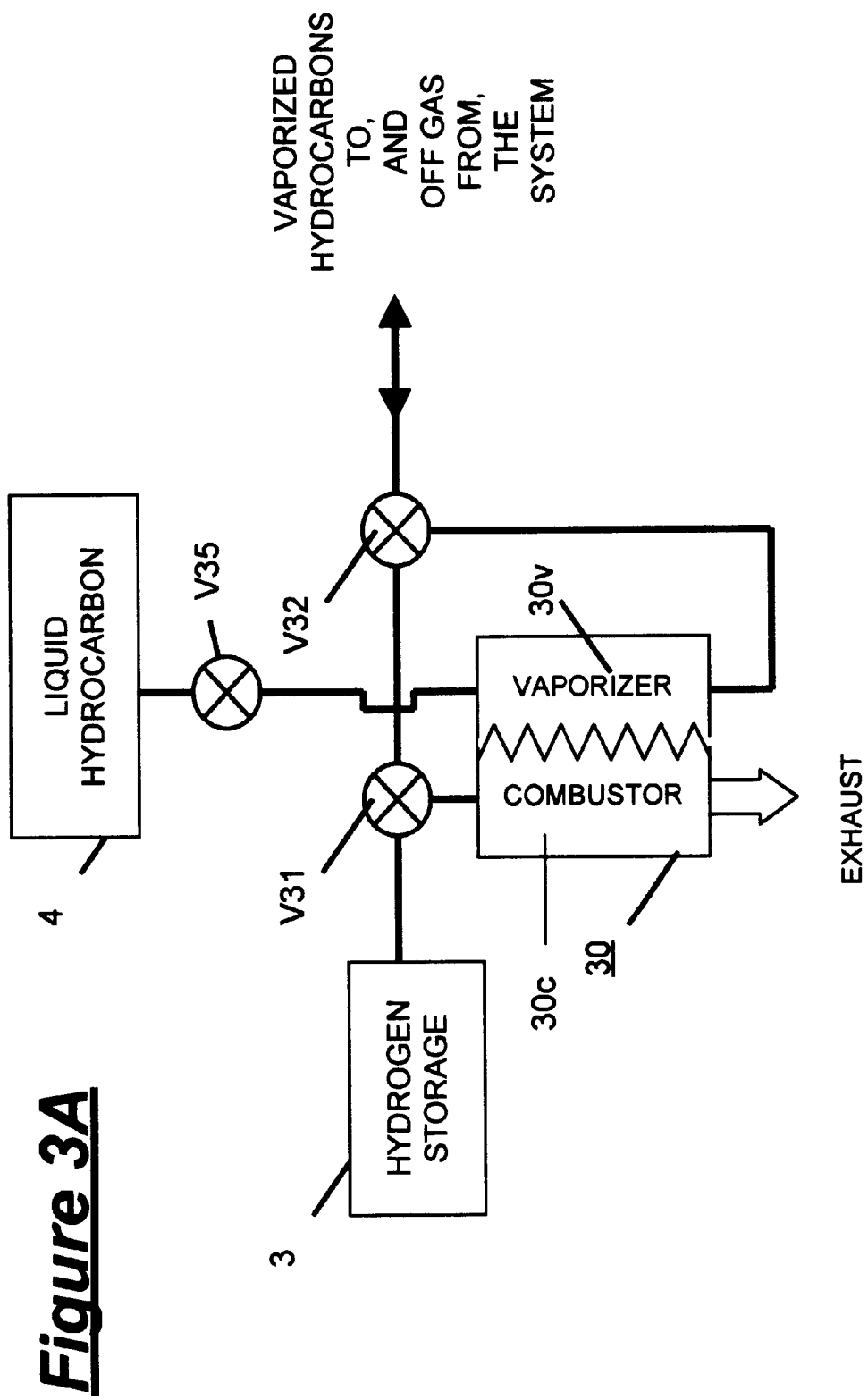
FIG. 3A is a diagram of an example of an ignition system with a single micro component combustor/vaporizer heat exchanger unit interconnected with a supply of hydrogen used in a minor quantity for start up and the hydrocarbon fuel supply.

FIG. 3A depicts a single unit micro component utilized as the system starter. As in the above embodiments, the micro component heat exchanger assembly includes an enclosure with inlet and outlet ports connected to laminar flow channel sections on opposite sides of a wavyplate separator in the assembly. In the FIG. 3A embodiment, the ignition unit includes heat exchanger module 30 with combustor 30c and vaporizer 30v sections on the opposite sides of the HEX unit. Valve V35 controls the flow of hydrocarbons into the system. The opposite sides of the HEX unit are interconnected with each other and with the fuel cell system by valves V31 and V32. Separate feeds of hydrogen and hydrocarbons to the unit at the start are controlled by valves V31 and V35. At the start, V31 and V35 open to allow hydrogen into catalytic combustor 30c and hydrocarbons into vaporizer 30v on the opposite sides of the HEX unit 30. Once the fuel cell system is running V31 closes and shuts down the introduction of hydrogen, but opens to allow the introduction of fuel cell off gas into combustor 30c. The flow of hydrocarbons through vaporizer 30v continues with a portion of the vaporized hydrocarbons being fed back to the combustor 30c controlled by regulator valve or valves V32. The major portion of the vaporized hydrocarbons are introduced to the fuel cell system where a portion of the vaporized hydrocarbons are processed in a steam or auto thermal reformer and a further portion is mixed with off gas to provide heat energy for the system. The device of FIG. 3A requires a combustion catalyst on side 30c useful with both hydrogen and hydrocarbons.

Figure 3B:
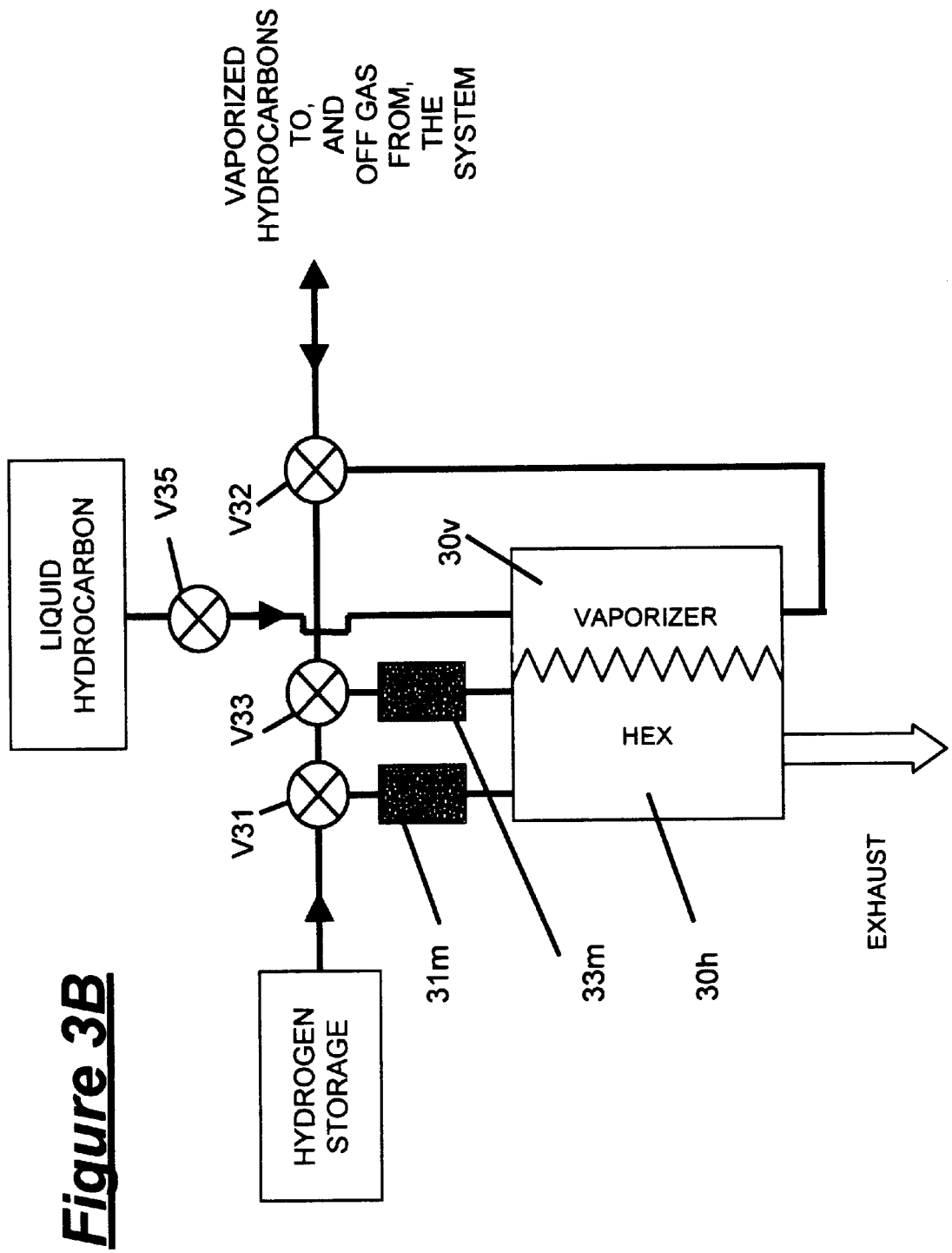
FIG. 3B is an alternate embodiment of the system of FIG. 3A including pre-combustors for the hydrogen and hydrocarbons before the heat exchanger unit.

FIG. 3B shows an alternate embodiment of the HEX configuration of FIG. 3A, further including metal foam catalyst combustors used with hydrogen and hydrocarbons 31m and 33m in advance of the HEX units. Here, the section 30h of the HEX unit is not catalytically active, but functions as one side of a heat exchanger for the vaporizer section 30v of the HEX unit. Valve V33 regulates the flow of fluids introduced though V31 and V32 to combustor 33m between the start up and steady state operation of the system.

Figure 4A:
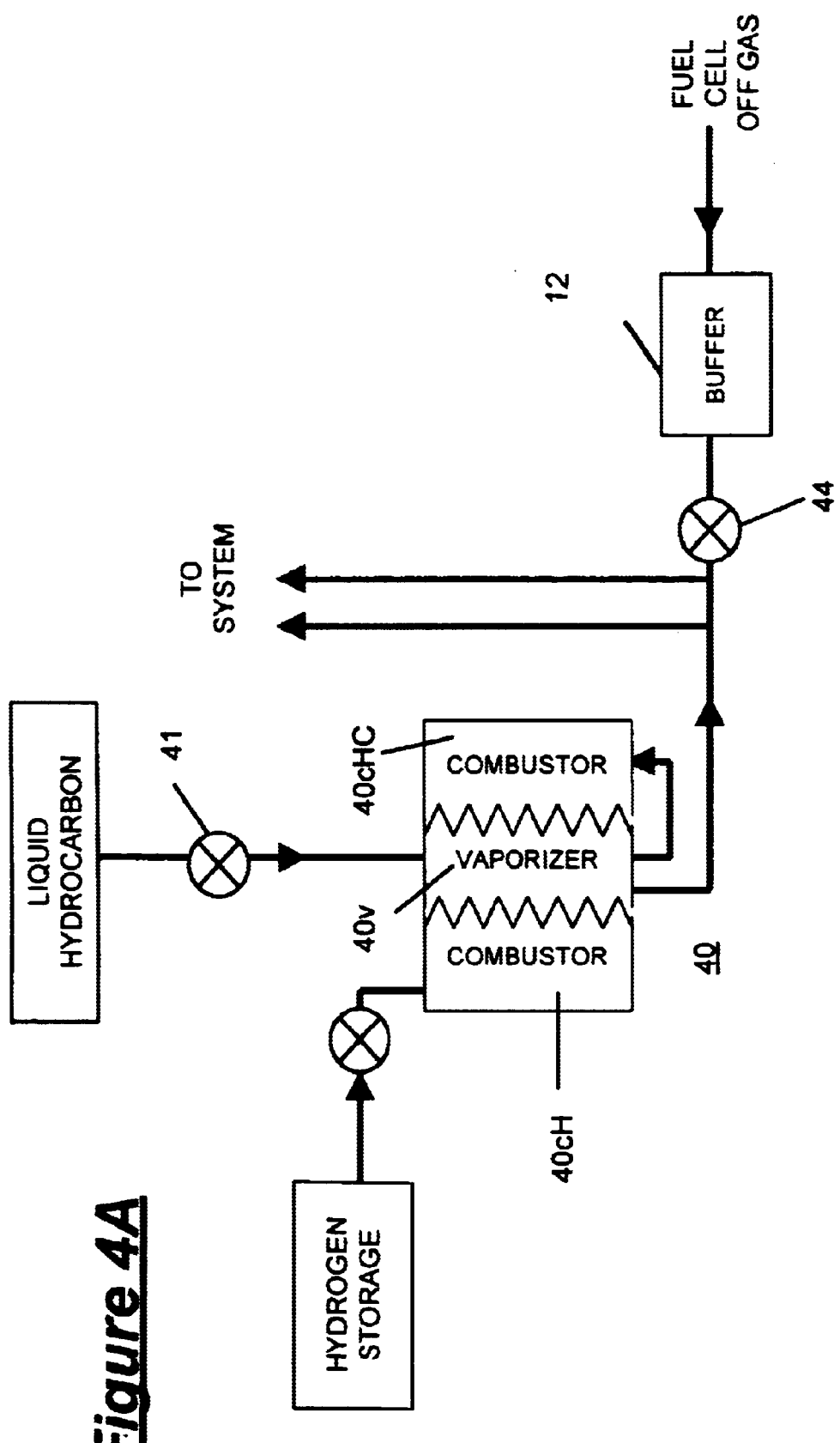
FIG. 4A shows an embodiment with an integrated module combining two combustor/vaporizer heat exchanger units in a single component.

FIG. 4A shows a sandwich assembly of a combustor/vaporizer/combustor micro component starting device. Table II specifies module section functions and identifies the catalysts on the side of the separator wavyplate that divides the respective module sections:

TABLE II

MODULE SECTION PROPERTIES

| | |
|---|---|
| Combustor 40cH: | Function: Hydrogen is mixed with air and burned. Catalyst on wavyplate separator: Pd |
| Vaporizer 40v: | Function: Hydrocarbons are vaporized. Catalyst on wavyplate separator: None |
| Combustor 40cHC: | Function: Vaporized hydrocarbons, mixed with fuel cell off gas, are combusted and heat energy is directed to vaporizer 40v. Catalyst on wavyplate separator: Pt/Pd |

Figure 4B:
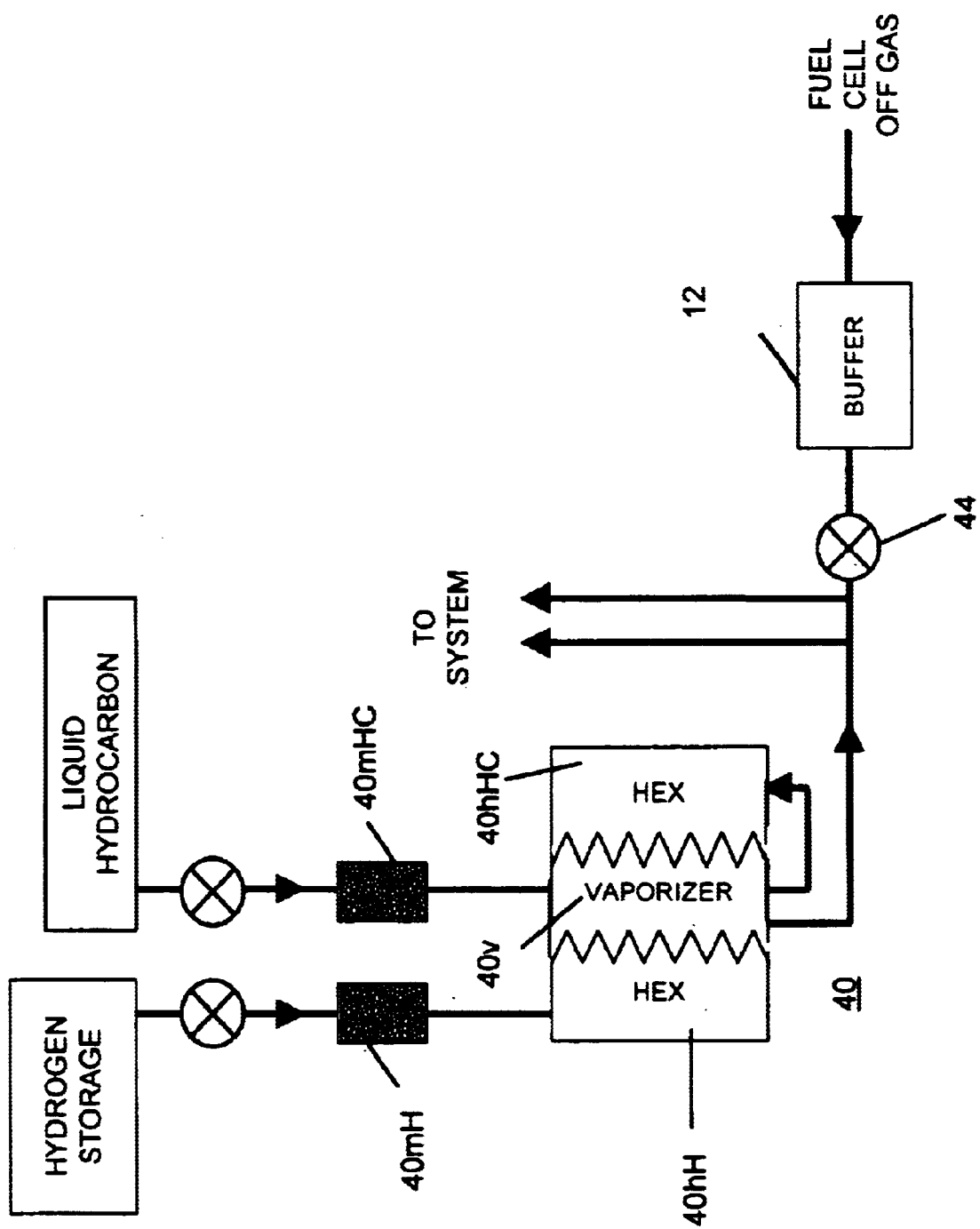
FIG. 4B shows an embodiment with an integrated module combining two heater/vaporizer heat exchanger units in a system including metal foam combustors for hydrogen or hydrocarbons, or both, in respective flow paths to the heater/vaporizer/heater module.
Figure 4C:
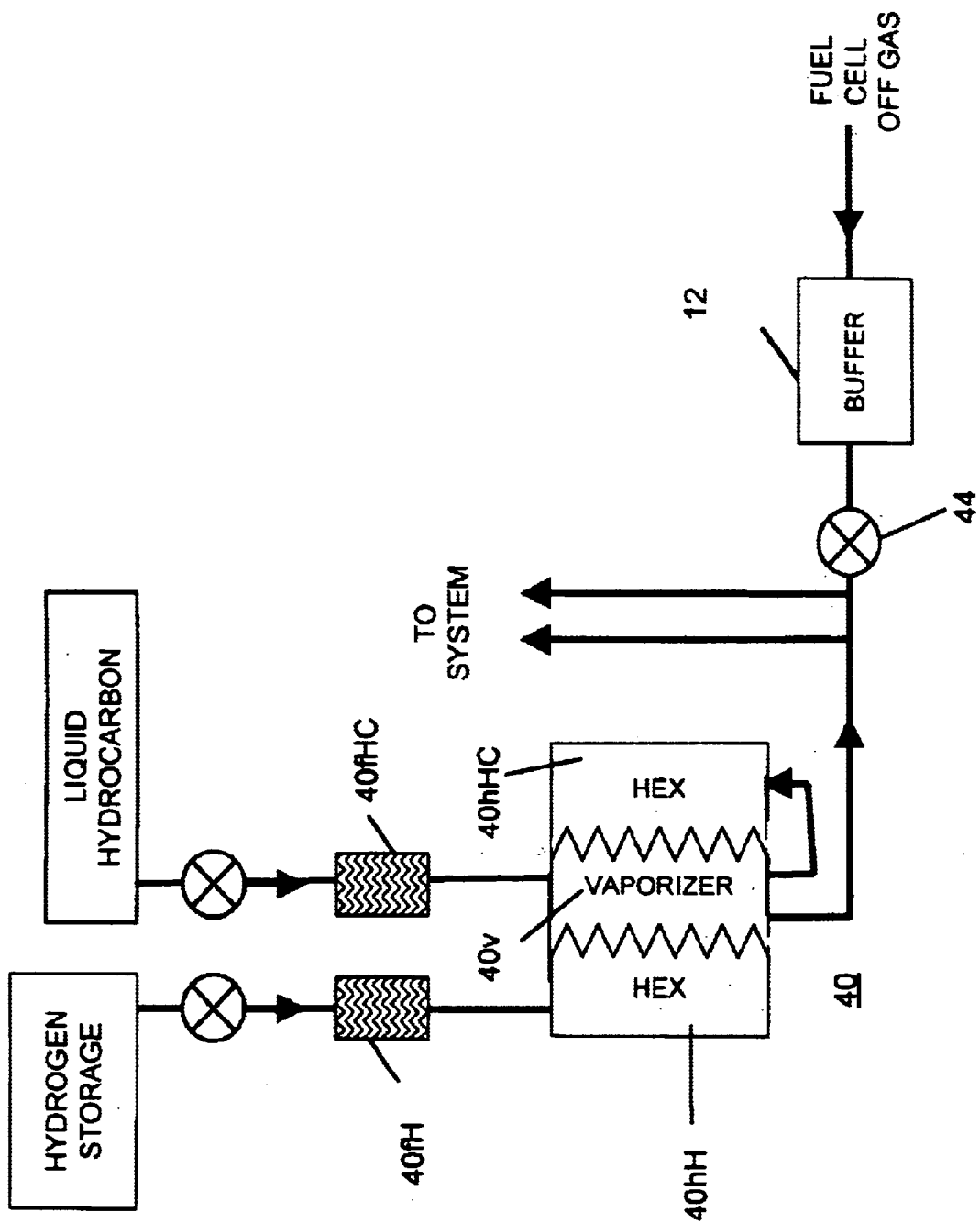
FIG. 4C shows an embodiment with an integrated heater/vaporizer/heater module heat exchanger units in a system including flame combustors for hydrogen or hydrocarbons, or both, in respective flow paths.

Valves or switches, 41 and 44, respectively, control the flow of hydrocarbons from a tank or storage unit, and gas from the buffer 12. FIG. 4B shows an alternate embodiment of the HEX configuration of FIG. 4A, further including metal foam catalyst combustors, 40 mH and 40 mHC, used in the flow streams of one or both of hydrogen hydrocarbons in advance of flow to the heater sides 40 hH and 40 hHC of the heater/vaporizer/heater module 40. Similarly, FIG. 4C shows an embodiment with flame or spark initiated combustors 40 fH and 40 fHC in the hydrogen and hydrocarbon flow streams to the vaporizer module. In these embodiments, the side(s) of the HEX unit preceded by the combustor(s) is (are) not catalytically active, but functions as a heater in a heat exchanger for the vaporizer section of the HEX unit.

Figure 5D:
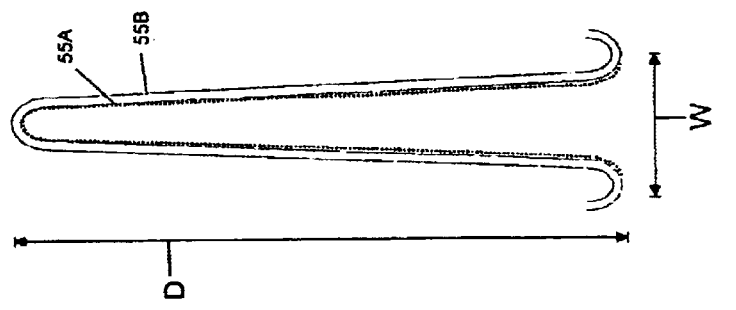
FIGS. 5A, 5B, 5C, 5D and 5E respectively depict (a) a cross-section of a wavyplate heat exchanger assembly; (b) a perspective view of a wavyplate heat exchanger assembly (sides omitted); (c) a detail of a wavyplate channel section with a catalyst on one side of the separator; and the channel width to channel depth aspect ratio in (d) wavyplate channels and (e) angled channels in the assemblies.
Figure 5C:
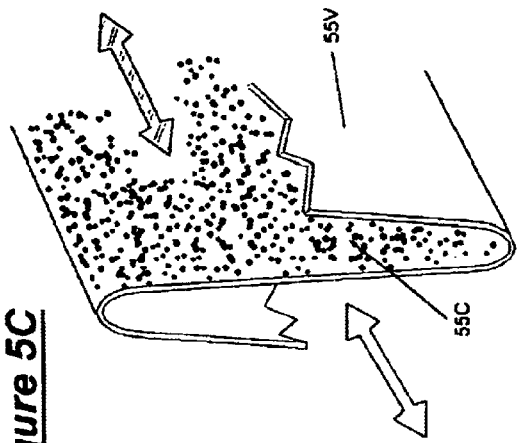
Figure 5E:
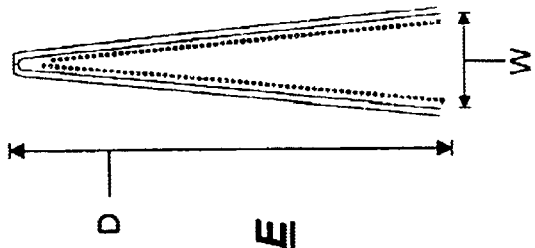
Figure 5A:
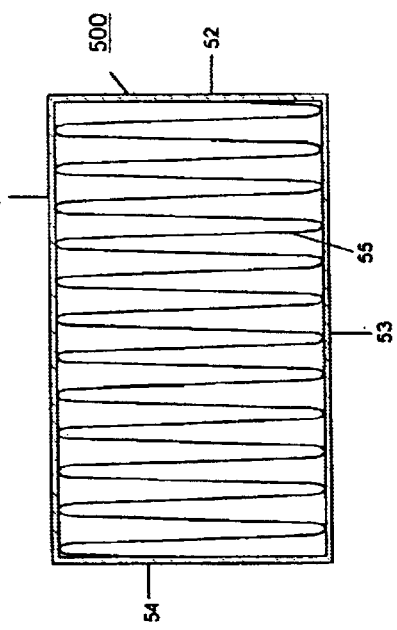
Figure 5B:
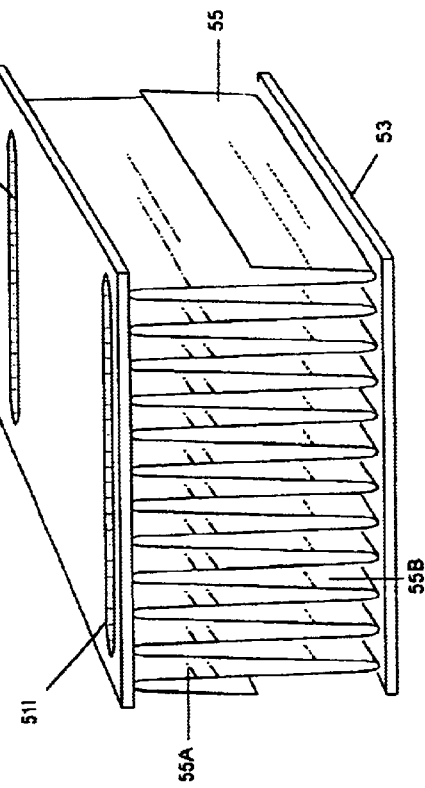

The configurations of various micro component heat exchanger module assemblies are shown in FIGS. 5A and 5B corresponding to the heat exchanger units referenced in FIGS. 1A and 1B (21 and 22) and 2A and 2B (1 and 2) and FIGS. 3A and 3B (30). The units provide separate laminar fluid flows directed in the separate sections on opposite sides of a wavyplate in a module. The module includes an enclosure with a top, bottom and sides (not shown in certain of the drawings for purposes of clarity). Each combustor or vaporizer section includes inlet and outlet orifices for the introduction and exhaust of fluid flow therein. FIG. 5A is a cross sectional view of a module embodiment 500 showing an enclosure having top 51, bottom 53, and sides 52 and 54. (front and rear sides not shown) in the view of a module of FIG. 5B, top inlet and outlet orifices are shown at 51I and 51O; the inlet and outlet orifices on the bottom side 53 are similarly configured. The wavyplate separator 55 divides the module into heater/combustor 55A and vaporizer 55B sections on the opposite sides of the plate where laminar fluid flow occurs in the unit.

Depending on design parameters, laminar fluid flows through the module sections with respect to individual module sections may be in the same direction (co-flow) or in opposite directions (counter flow). Micro channels in the units have a predetermined point to point separation and are optimally designed to have a maximum depth (a high aspect ratio) allowing fluid flow to pass over a maximized surface area. As noted in the examples, wavyplate channel sides may, or may not, include a catalyst coating. FIG. 5C shows a channel section with catalyst coating on combustor side 55C of the channel wall opposite vaporizer side 55V. Channel length determines the residence time of a fluid increment which in turn depends on pressure change in the channel. In a representative channel unit, with a nominal channel gap of 250 microns +/− 50 microns, the channel width to depth aspect ratio, as shown as W:D in FIG. 5D and FIG. 5E may be in the range from 1:10 to 1:100 such that surface area in the channel is maximized as a design parameter.

The combustor sections include a catalyst for inducing combustion, as noted with the embodiments of FIGS. 2B and 3B. A catalyst combustor may precede the module, eliminating the need for combustion to occur in the heater section of the HEX hydrocarbon vaporizer. In such embodiments, the module is a micro component heat exchanger, without catalyst on either side of the wavyplate separator.

Figure 6C:
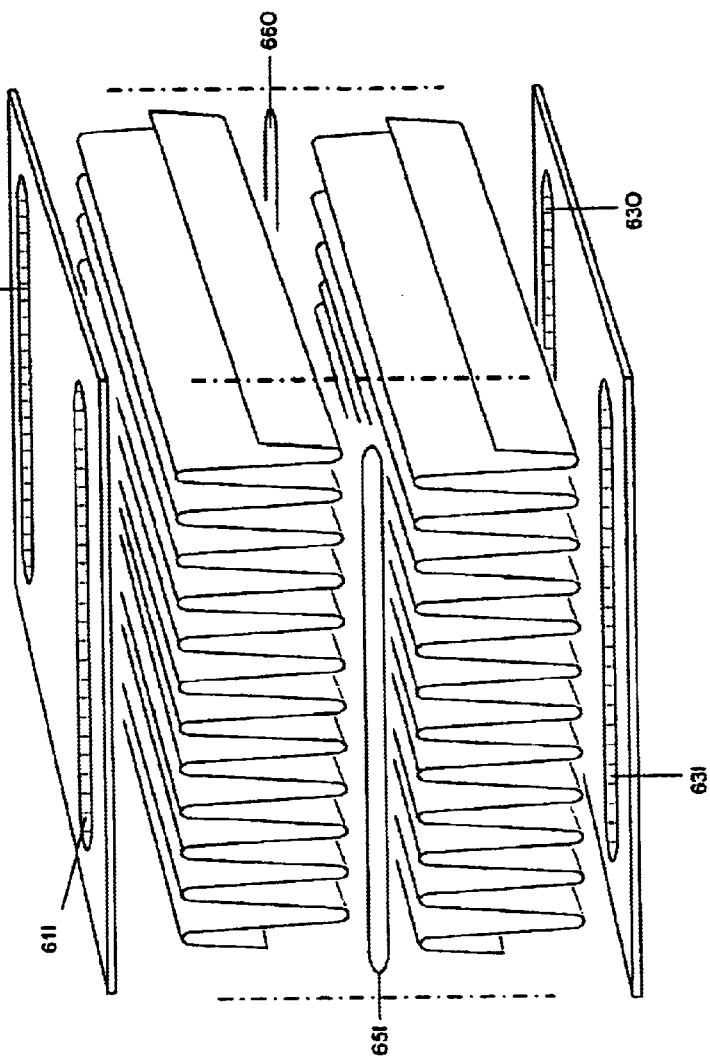
FIGS. 6A, 6B and 6C respectively depict cross-sections (FIGS. 6A and 6B) and an exploded view of dual wavyplate module embodiments with heater-combustor/vaporizer/heater-combustor configurations.
Figure 6B:
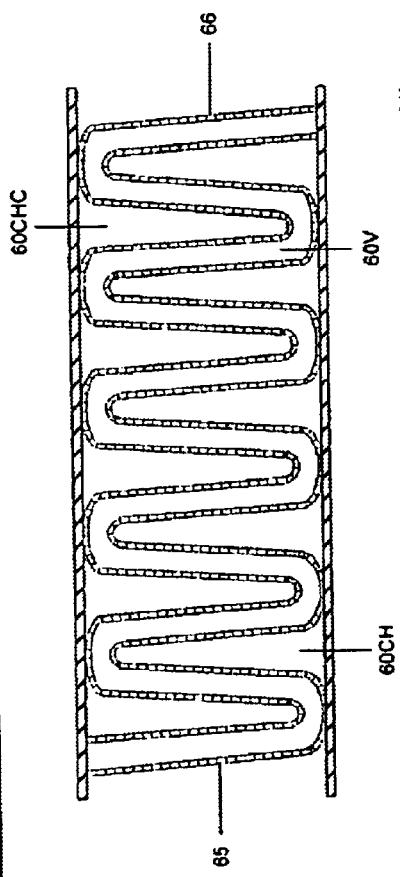
Figure 6A:
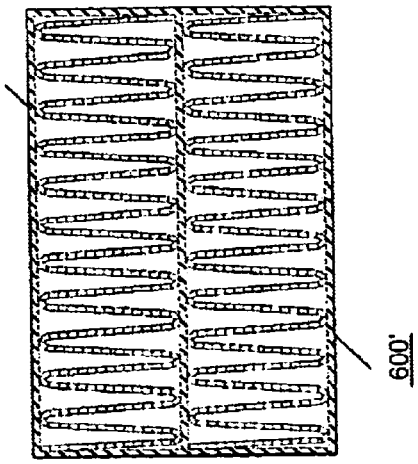

FIG. 6A, FIG. 6B and FIG. 6C illustrate sandwich assemblies of heat exchanger vaporizer/combustor units. FIG. 6A shows stacked or adjacent units, 600 and 600' of a HEX module such as shown in FIG. 5B. FIG. 6B and FIG. 6C are cross section and exploded views of a combustor/vaporizer/combustor assemblies in which two separated wavyplates 55 and 65 define the operative sections 60 cH (hydrogen combustor), 60v (hydrocarbon vaporizer) and 60 cHC (hydrocarbon combustor), of a unit as described with reference to FIG. 4A. An appropriate face plate manifold introduces the flow of fluid to the central vaporizer section of the unit. In the example of FIG. 6C, inlet and outlet orifices for the respective combustor-heater/vaporizer and combustor-heater sections are shown at 61I and 61O, 65I and 66O and 63I and 63O. Inlet and outlet are not intended as terms restrictive of the direction of fluid flow as flow may physically be co-flow or counter flow in either direction in the adjacent channel sections. Similarly, the orifices indicated may comprise alternately shaped openings and/or manifolds that appropriately direct the fluid flow into the respective channels in the designated sections of a HEX module. As discussed above, catalyst may not need to be included in the heater side channels of a HEX module when hydrogen or hydrocarbon combustors precede the respective heater side as shown, for example, in FIGS. 2B, 3B, 4B and 4C.

Gasoline-like fuel is a preferred hydrocarbon for use in the system, because of its widespread production and distribution network, its general availability and its utility as a feed stock in the hydrogen reforming process. The start module is scalable as a micro component to meet varying requirements in which incremental design units are determined by the number of channels in the unit sections. Fluid flow is induced through the channels as a result of pressure differentials in the order of a differential pressure drop of less than 100 psi. The laminar flow through the channels provides a low pressure drop in the system.

Water, in the form of condensate from fuel cell system exhaust, is introduced through a pump as is the hydrocarbon component introduced under pressure. Reaction balance in the system is achieved by variably adjusting pump and compressor pressures to maintain fluid flow such that reactions are balanced.

Having described the invention in detail, those skilled in the art will appreciate that, given the present disclosure; modifications may be made to the invention without departing from the spirit of the inventive concept herein described. Rather, it is intended that the scope of the invention be determined by the appended claims.

What is claimed is:

1. An ignition system for initiating the on demand start up of an interconnected hydrogen gas producing reactor and a hydrogen fuel cell comprising:

co-operatively engageable micro component heat exchangers units enclosed in a volume defined by upper and lower plate sections disposed in a parallel relationship, and side and end sections defining a perimeter, in which each heat exchanger unit has a heat conductive separator therein forming a plurality of adjacent and longitudinally extending parallel micro channels, the separator comprising a metal sheet shaped into a form having alternating apexes forming parallel, longitudinally extending micro channels on opposite sides of the separator in a correspondence with the form in the sheet, the separator being disposed between the upper and lower plate sections in which alternating apexes of the form shaped in the sheet are bonded, respectively, to the interior facing surfaces of the upper and lower plate sections;

longitudinally spaced apart inlet and outlet openings disposed transverse to the micro channels at approximately the end sections of the upper and lower plate sections, allowing the entry and exit of fluid flow into and from the micro channels on each opposite side of the separator;

the heat exchangers units being operatively interconnected with switchable sources of hydrogen and liquid hydrocarbons and with each other, and with the hydrogen gas producing reactor and the fuel cell fed by the reactor, in a relationship in which:

in a start mode, a first side of a first heat exchanger unit is switched to the source of hydrogen and the second side of the first heat exchanger unit is switched to the source of hydrocarbons such that the switches, hydrogen and hydrocarbons are respectively introduced to the first and second sides of the first heat exchanger unit and the combustion of hydrogen on the first side of the first heat exchanger unit provides heat energy to the second side of the first heat exchanger unit to vaporize the hydrocarbons introduced therein, the outlet of the second side of the first heat exchanger unit is switched to direct vaporized hydrocarbons to a first side of a second heat exchanger unit to provide heat energy to a second side of the second heat exchanger unit such that, a flow of hydrocarbons is switched to the second side of the second heat exchanger unit and the hydrocarbons are vaporized therein, and the vaporized hydrocarbons from the second side of the second heat exchanger unit are introduced into the hydrogen gas producing reactor as one or more than one of i) an energy source for combustors and ii) a feedstock for the production of hydrogen, whereupon, upon the initiation of the hydrogen gas producing reactor that feeds hydrogen gas to the fuel cell, the first side of the second heat exchanger unit is switched to a flow of off gas from the fuel cell and the flows of hydrogen and hydrocarbons to the first heat exchanger unit switched off.

2. The ignition system of claim 1 in which one side of at least one heat exchanger unit comprises a combustor for the generation of heat energy and includes a catalyst.

3. The ignition system of claim 2 in which the combustor comprises a micro channel for directing laminar fluid flow in which a side segment of the micro channel is coated with the catalyst.

4. The ignition system of claim 2 in which the combustor comprises a metal foam catalyst module interconnected with the heat exchanger unit.

5. The ignition system of claim 2 in which the combustor comprises a flame combustor.

6. The ignition system of claim 2 or claim 3 or claim 4 in which the catalyst is selected from one or more than one of platinum and palladium.

7. The ignition system module of claim 4 in which hydrogen is combusted in the catalyst module and heat energy from the combustion is introduced to the first side of the first heat exchanger unit.

8. The ignition system of claim 4 in which the hydrogen gas producing reactor is a steam reformer.

9. The ignition system of claim 1 in which the hydrogen gas producing reactor is an auto thermal reformer.

10. The ignition system of claim 1 in which the switchable heat exchanger units include two separately enclosed units, each unit having micro channels defined by a wavyplate separator disposed within the unit, in which wavyplate comprises heater micro channels on one side and vaporizer micro channels on the opposite side.

11. The ignition system of claim 1 in which the switchable heat exchanger units include a pair of spaced apart wavyplate separators disposed in the volume of the same enclosure, the separators defining i) a central vaporizer disposed between facing sides of the wavyplate separators and ii) a separate combustor section and a separate/heater sections on the sides of the wavyplates opposite the central vaporizer.

12. The ignition system of claim 1 in which a minor portion of the vaporized hydrocarbons exiting from the outlet of the second side of the second heat exchanger unit are introduced into the inlet of the first side of the second heat exchanger unit and provide an energy source for the vaporizer on the opposite side of the second heat exchanger unit.

13. The ignition system of claim 12 in which the minor portion of the vaporized hydrocarbons is in the order of approximately 3% to approximately 12% by mass.

14. The ignition system of claim 12 in which the minor portion of the vaporized hydrocarbons exiting from the second side of the second heat exchanger unit introduced into the first side of the second heat exchanger are mixed with fuel cell off gas.

15. The ignition system of claim 1 in which micro channels formed in the separator have a width to depth aspect ration of less than 1:100.

16. The ignition system of claim 1 in which micro channels formed in the separator have a width to depth aspect ration greater than 1:10.

17. A starter for initiating the on demand start up of a hydrogen gas producing reactor for powering a mobile fuel cell comprising:

a switchable interconnection between sources of hydrogen gas, hydrocarbons and off gas from the fuel cell and a starter unit;

a starter unit including a dual channeled heat exchanger having micro channels disposed with respect to opposite sides of a conductive separator within an enclosure in which laminar fluid flow is maintained on opposite sides of the separator, the micro channels of the opposite sides of the separator being operatively interconnected with the switchable sources of hydrogen, hydrocarbons and to the fuel coil in a relationship in which:

initially, the micro channels on the first side of the heat exchanger are interconnected with the source of hydrogen and the micro channels on the second side of the heat exchanger interconnected with the source of liquid hydrocarbons, whereby, hydrogen combusts in the micro channels and provides heat energy to the second side and the hydrocarbons that are introduced to the second side are vaporized therein, and subsequently, a minor portion of the vaporized hydrocarbons from the second side are returned to the first side of the heat exchanger to combust and provide heat energy to the second side, and the major portion of the vaporized hydrocarbons exiting from the second side are introduced into the hydrogen reactor as one or more than one of i) an energy source for combustors and ii) a feedstock component, and when the hydrogen gas producing reactor initiates, the first side of the heat exchanger is switched to off gas from the fuel cell and the flow of hydrogen to the first side is switched off.

18. The starter of claim 17 in which the minor portion of the vaporized hydrocarbons is in the order of approximately 3% to approximately 12% by mass.

19. The starter of claim 17 on which the first side of the heat exchanger includes a catalyst.

20. The starter of claim 17 in which a catalytic combustor is interposed between one or more than one of i) the source of hydrogen and ii) the source of hydrocarbons.

21. The starter of claim 18 in which a catalytic combustor is interposed between one or more than one of i) the source of hydrogen and ii) the source of hydrocarbons.

22. The starter of claim 17 in which a flame combustor is interposed between one or more than one of the source of hydrogen and the source of hydrocarbons.

23. The starter of claim 17 in which the catalyst is selected from one or more than one of platinum and palladium.

24. The starter of claim 18 in which the catalytic combustor comprises a module including a metal foam.

25. The starter of claim 24 in which the metal foam includes one or more than one of platinum and palladium.

* * * * *